United States Patent [19]

Feser et al.

[11] Patent Number: 5,213,188
[45] Date of Patent: May 25, 1993

[54] CLUTCH DISK FOR A MOTOR VEHICLE FRICTION CLUTCH

[75] Inventors: Erich Feser, Gössenheim; Harald Jeppe, Schwanbergstrabbe; Matthias Fischer, Eltingshausen, all of Fed. Rep. of Germany

[73] Assignee: Fichtel & Sachs, Schweinfurt, Fed. Rep. of Germany

[21] Appl. No.: 846,676

[22] Filed: Mar. 5, 1992

[30] Foreign Application Priority Data

Mar. 6, 1991 [DE] Fed. Rep. of Germany ....... 4107126

[51] Int. Cl.$^5$ .......................... F16D 3/66; F16D 13/64
[52] U.S. Cl. ..................... 192/106.2; 464/68
[58] Field of Search .................. 192/106.2; 464/68, 63, 464/67

[56] References Cited

U.S. PATENT DOCUMENTS

| 4,700,821 | 10/1987 | Maucher et al. ................. 464/68 X |
| 4,700,822 | 10/1987 | Maucher et al. ................. 192/106.2 |
| 4,860,871 | 8/1989 | Graton et al. ............... 192/106.2 X |
| 4,883,156 | 11/1989 | Rohrle et al. ..................... 464/68 X |
| 4,890,712 | 1/1990 | Maucher et al. ................. 192/106.2 |

FOREIGN PATENT DOCUMENTS

| 3429725 | 7/1985 | Fed. Rep. of Germany ... 192/106.2 |
| 3616163 | 11/1986 | Fed. Rep. of Germany . |
| 2616499 | 12/1988 | France ............................. 192/106.2 |
| 2181817 | 4/1987 | United Kingdom .................. 464/63 |

Primary Examiner—Rodney H. Bonck
Attorney, Agent, or Firm—Anderson Kill Olick & Oshinsky

[57] ABSTRACT

A clutch disk for a motor vehicle friction clutch is proposed of which the torsional vibration damper, designed for idle running, is arranged radially between a hub and springs of a torsional vibration damper designed for load running. The idling damper is arranged axially between a hub disk and one of the lateral disks of the load damper torsionally elastically coupled to the hub disk. The idling damper comprises an input part, produced from plastics material, which is non-rotatably connected to the hub disk coupled with rotational play but otherwise non-rotatably to the hub. The output part of the idling damper also consists of plastics material and is non-rotatably connected to the hub. Helical springs, couple the output part torsionally elastically to the input part. Pairs of projections, shaped on the input part, enclose the springs between themselves and are supported through the pockets on the hub disk. Additional supporting elements, which engage in openings in the hub disk, are shaped on the outer periphery of the input part. The input part also forms a friction face of a friction device designed for load running. A friction face of a friction device, designed for idle running, is shaped on a tubular attachment of the output part. Entry bevels and catch shoulders are shaped on the projections of the input part for assembly purposes. The components of the idling damper can be oriented, relative to the hub flange, during assembly by means of a guiding tool.

25 Claims, 6 Drawing Sheets

CLUTCH DISK FOR A MOTOR VEHICLE FRICTION CLUTCH

BACKGROUND OF THE INVENTION

The invention relates to a clutch disk for a motor vehicle friction clutch and, in particular, a clutch disk with a load torsional vibration damper designed for load running and an idling torsional vibration damper designed for idle running.

A clutch disk for a motor vehicle friction clutch is known from U.S. Pat. No. 4 700 822, on whose hub, which is to be coupled to the gear input shaft, there are rotatably mounted two lateral disks of a load vibration damper designed for load running, the lateral disks being axially spaced from one another and being rigidly connected to one another by rivets. A hub disk which is connected with limited rotational play but otherwise non-rotatably to the hub via teeth is arranged axially between the two lateral disks, one lateral disk at the same time carrying the clutch friction linings. Load springs designed for load running couple the lateral disks forming the input part of the load damper torsionally elastically to the hub disk forming the output part of the load damper. Radially between the region of arrangement of the load springs and the hub, axially between one of the lateral disks and the hub disk, there is arranged an idling torsional vibration damper which is designed for idle running and in turn comprises two lateral disks non-rotatably connected to one another and a hub disk which is arranged between the lateral disks and is coupled torsionally elastically to the lateral disks via idling springs designed for idle running. The lateral disks as well as the hub disk of the idling damper consist of plastics material. The lateral disks are non-rotatably connected to one another and to the hub disk of the load damper by a peg-type joint. They form the input components of the idling damper of which the output component is formed by the hub disk resting non-rotatably on teeth of the hub. One of the lateral disks of the idling damper rests with frictional contact on the adjacent lateral disk of the load damper and forms a friction element of a load friction device which is designed for load running and of which the Belleville spring washer provides the axial pressing force. The hub disk of the idling damper, on the one hand, rests on an axial shoulder of the hub and, on the other hand, is provided with a tubular projection of which the axial end face also rests on said lateral disk of the load damper. A corrugated spring which is arranged on the side of the hub disk axially removed from the idling damper and is fixed between an axial shoulder of the hub and the other of the two lateral disks of the load damper tensions the end face of the tubular projection of the hub disk of the idling damper in order to produce basic friction against said first lateral disk of the load damper. The idling damper of the known clutch disk consists of comparatively many individual parts which necessitate some assembly costs.

A further clutch disk is known from DE-A-36 16 163, of which the idling damper designed for idle running is again arranged radially between the arrangement region of load springs and the hub of the clutch disk on the one hand and one of the lateral disks and the hub disk of the load damper connected to the hub via teeth on the other hand. The idling damper has an integral input part which is produced from plastics material, contains springs designed for idle running in a plurality of pockets and is non-rotatably connected to the hub disk via projections which engage in openings in the hub disk. Axially between the input part and the hub disk of the load damper there is arranged an output part, produced from sheet metal, of the idling damper which is non-rotatably connected to the hub via the teeth of the hub and has projections which engage into the pockets peripherally on both sides of each idling spring and couple the output part torsionally elastically to the input part. The pockets of the input part are limited in the peripheral direction by end faces which co-operate with the front ends of the idling springs designed as helical springs. Pocket extensions into which the projections of the output part escape during a relative rotation of input part and output part adjoin the end faces. The input part rests with a plane face on the adjacent lateral disk of the load damper and at the same time forms a friction element of a friction device which is designed for load running and of which the axially acting spring is arranged between the hub disk and the other lateral disk of the load damper. With this clutch disk, additional friction rings are required for producing idling or basic friction. As the components of the idling damper are slack, problems can arise during assembly.

The invention now is to provide a clutch disk for a motor vehicle friction clutch which can be produced economically and can be assembled easily with a small number of components in its idling damper.

SUMMARY OF THE INVENTION

The invention is based on a clutch disk for a motor vehicle friction clutch which comprises the following features:

a hub which defines an axis of rotation, a load torsional vibration damper designed for load running with two lateral disks which are axially spaced from one another, are rigidly connected to one another and are mounted so as to rotate equi-axially on the hub, a hub disk which is axially arranged between the lateral disks and is connected non-rotatably but with limited rotational play to the hub in particular via teeth and a plurality of load springs which rest in apertures in the lateral disk on the one hand and the hub disk on the other hand, are distributed in the peripheral direction, are designed for load running, in particular are constructed as helical springs, an idling torsional vibration damper, which is designed for idle running and acts within said limited rotational play coupling the hub disk to the hub, with an input part of plastics material, non-rotatably connected to the hub disk, an output part non-rotatably connected to the hub in particular via teeth and at least one idling spring which couples these parts torsionally elastically to one another, is designed for idle running, in particular is constructed as a helical spring, wherein one of these two parts has a peripherally elongated pocket, which is peripherally limited by end faces, for each idling spring and the other of these two parts has peripherally spaced axially protruding projections which engage in pairs in each pocket and, together with the end faces, enclose the idling spring between themselves, wherein arc-shaped pocket extensions into which the projections escape during a relative rotation of input part and output part adjoin each pocket on both sides in the peripheral direction, wherein the input part and the output part are arranged on the one hand radially between the hub and the arrangement region of the load springs and on the other hand axially between the hub disk and a first one of the two lateral disks and the output part is located substantially axially between the input part and the hub disk, and wherein the input part forms a plane friction face with which it rests in frictional contact on the first lateral disk and, over a diameter which is greater than the diameter on which the projections are arranged, has a plurality of peripherally mutually offset supporting elements which engage axially in openings in the hub disk for non-rotatable connection of the input part to the hub disk and comprise axial stops resting on the hub disk, a load friction device designed for load running with an axially acting spring which tensions at least the friction face of the input part and the first lateral disk axially against one another and clutch friction linings held on one of the lateral disks.

With such a clutch disk, it is proposed according to a first aspect of the invention that the output part is produced integrally from plastics material, is fixed toward the hub disk on an axial stop of the hub and contains the pockets and in that the projections are offset peripherally relative to the supporting elements and are shaped integrally on the input part together with the supporting elements. Only two components which can be produced completely from plastics material, demand little space axially as well as radially owing to their design and can easily be assembled are required for guiding and controlling the idling spring or springs.

In a preferred embodiment, the pocket and pocket extensions are perforated toward the hub disk, the projections of the input part penetrating axially through the pocket and the pocket extensions and being axially supported with their front ends on the hub disk. In this way, the input part absorbing the axial forces of the load friction device is supported not only via the stop faces of the supporting elements but also via the projections on the hub disk, guaranteeing large-area support of the input part and ensuring uniform contact on the lateral disk even if the input part has relatively small material cross sections.

Independently of the advantageous support of the input part, axial perforations provided in the region of the pockets and pocket extensions are advantageous, particularly if they are provided between the end faces of each pocket and have a radial height in the region of the end faces which is substantially equal to half the external diameter of the idling spring. Production of the output part is simplified by perforations of this type in that excessively thin material cross sections are avoided and, moreover, the mass moment of inertia of the output part can be reduced. The axial perforation of the pocket is preferably limited radially inwardly by a face extending rectilinearly in the peripheral direction and radially outwardly by a face which is curved round the axis of rotation so that it is adapted to the path of movement of the idling spring and the projections. The pocket extensions, on the other hand, are preferably constructed as axially continuous slots limited by radially inner and radially outer arc-shaped faces into which the perforation of the pockets passes.

A second aspect of the invention which can be employed if the pockets provided for receiving the idling springs are shaped in the input part and the projections provided for controlling the idling spring are shaped on the output part again proposes that both the input part and the output part be produced from plastics material, the projections allocated in pairs to the pocket having noses which protrude toward one another and penetrate into the interior of the idling spring constructed as a helical spring. The helical spring can therefore be placed onto the projections during assembly, and this is particularly advantageous in the case of idling dampers with several springs. The helical springs can therefore be pre-assembled on the projections, for example of the input part, and can be inserted as a pre-assembled component into the pockets. This is particularly advantageous if, as is normal with stepped torsional vibration dampers, a proportion of the springs rests in pockets which hold the spring with play in the peripheral direction between their end faces.

An embodiment in which each nose has an entry bevel for the end of the helical spring on its side located axially toward the free end of the projection and a catch ledge on its side which is axially remote from the free end of the projection is particularly advantageous. Not only does this simplify insertion of the springs between the projections with the above-described method of assembly, where the springs can be snapped over the entry bevels onto the noses and behind their catch ledge, but also allows assembly of the idling damper in such a way that the idling springs are firstly inserted into the pockets, for example the output part, whereupon the other part, for example the input part, is simultaneously placed with its projections first onto all springs simultaneously. The last-mentioned method of assembly can be applied, particularly if all helical springs are held in their pockets without play in the peripheral direction.

The variations described hereinafter can advantageously be employed with both aspects of the invention. In a preferred embodiment, the output part contains each pocket intended for engagement of the projections and is constructed, at least in the diametral region containing the pocket as a plane disk of which the axial thickness is greater, by an amount which is smaller than the thickness, than half the external diameter of the idling spring received by the pocket, and in that each pocket is peripherally limited by end faces with a circular sector-shaped contour, the circle centre of which is at approximately a distance corresponding to said amount from the lateral face of the disk adjacent to the input part and the circle radius of which is substantially equal to half the external diameter of the idling spring. Such an output part guides the idling springs perfectly in both the peripheral and the radial direction and simplifies insertion of the springs owing to its axially completely open construction.

The input part can also have a further pocket peripherally between each pair of projections holding the idling springs, the further pocket being peripherally limited by end faces which have a circular sector-shaped contour of which the radius is substantially equal to half the external diameter of the idling spring and of which the circle centre lies approximately in the centre of the axial span of the projections. In this way, the input part can be placed very tight against the output part, and the projections ensure that the front ends of the idling spring are surrounded symmetrically. The further pockets of the input part can also open into a perforation on the side axially facing the lateral disk so that production is also simplified here and the mass moment of inertia is reduced.

In a further preferred embodiment of the two aspects of the invention, the supporting elements and the openings of the hub disk into which they engage can have an approximately rectangular cross section and an axially extending rib can be shaped on at least one axially extending longitudinal side of each supporting element, the rib partially overlapping the contour of the opening and being plastically deformed when the input part is fitted on the hub disk. The input part can thus be fastened completely without play on the hub disk.

It is also proposed that the output part has, in its radially inner region, an axially protruding tubular projection which penetrates a central opening in the input part and rests with its front face in frictional contact on the first lateral disk and in that an axially acting spring of an idling friction device is arranged axially between a second of the two lateral disks and the hub disk and is fixed between the second lateral disk and a stop shoulder of the hub and tensions the first lateral disk against the front face of the tubular projection. The output part is thus additionally utilised to produce basic friction which acts over the entire rotational angle range of the vibration damper. The basic friction is preferably adapted to correspond to the frictional force required for idle running.

To simplify assembly of the idling torsional vibration damper, in particular in the case of automated assembly, at least one guide face for a guiding tool is shaped on the input part, on the output part and on the hub disk in each case and the guide faces are axially orientated relative to one another in the unloaded state of the idling spring. The guiding tool can be introduced axially without difficulty and can also be removed again for orientation of the components of the idling damper relative to the hub. The guide faces on the input part and on the output part are preferably radially externally open partial circle faces at the periphery of the input part and the output part. This type of guide face does not require additional space in the radial direction.

With clutch disks in which at least one of the load springs is arranged in an aperture of the hub disk, the aperture being peripherally enlarged in one of the two relative rotations of hub disk and lateral disks and keeping the load spring unloaded in a portion of the relative rotation, the guide face of the hub disk is preferably formed by an enlargement of the aperture in the region of its peripherally located end. The guide face can then be shaped on the edge of the aperture which is provided anyway.

It has proven particularly desirable if at least a pair of diametrally opposed guide faces is provided both on the input part and on the output part and on the hub disk. The clutch disk can be assembled rapidly and reliably with such an arrangement. The input part and the output part of the idling torsional vibration damper is preferably produced from polyamide which is preferably processed by injection moulding and preferably contains an addition of short glass fibres and of PTFE (polytetrafluoroethylene). The material composition is preferably selected such that the input part and the output part (in per cent by weight) contains about 30% of glass fibres and about 15% of PTFE, the outpart part additionally containing about 2% of silicon. Such a material composition produces on the one hand the necessary strength for torque transmission during idle running, has the necessary stability to temperature changes with regard to the expected frictional effect and at the same time has a suitable coefficient of friction. The strength and stability to temperature changes are substantially ensured by the polyamide in conjunction with the glass fibre content. The PTFE serves, among other things, to moderate the wear-promoting properties of the glass fibres so that a uniform coefficient of friction is maintained over the entire service life. The silicon added in the case of the output part together with the PTFE content lowers the coefficient of friction to a low value of the order of 0.18 to 0.20 which is desired for the basic friction. As the silicon content is lacking in the material composition of the input part, a higher coefficient of friction of, for example, 0.25 is produced. In conjunction with the mean frictional radius which is enlarged owing to the shape of the input part and the increased coefficient of friction, the input part, together with the lateral disk consisting of metal, can produce the considerably higher frictional force required for load running.

The various features of novelty which characterise the invention are pointed out with particularity in the claims annexed to, and forming part of, this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention is described in more detail hereinafter with reference to drawings.

DESCRIPTION OF PREFERRED EMBODIMENTS

Figure 1:
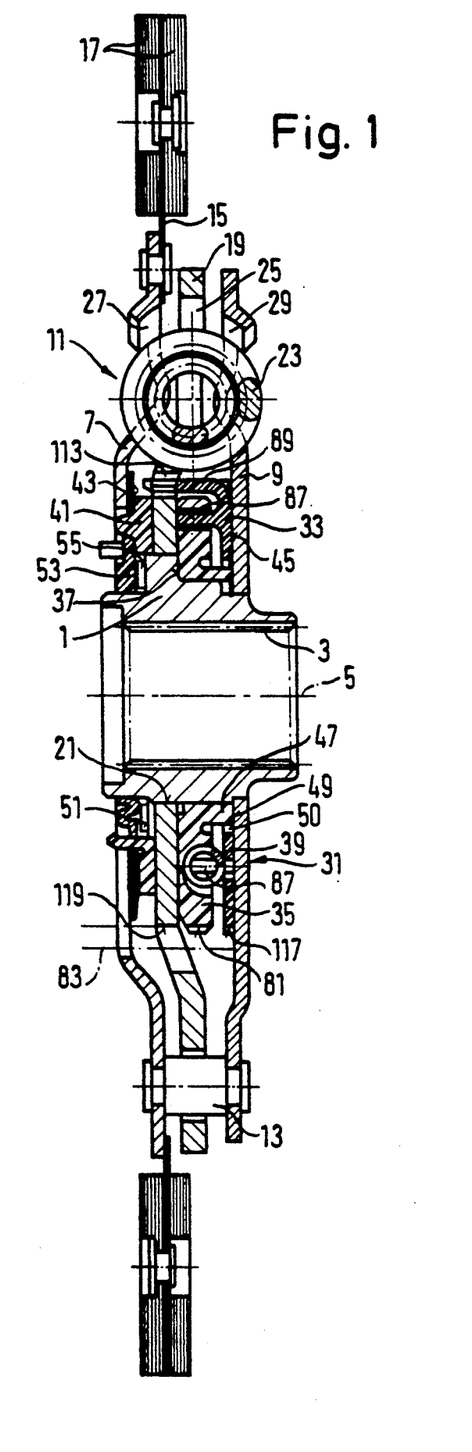
FIG. 1 is an axial longitudinal section through a clutch disk of a motor vehicle friction clutch.

FIG. 1 shows the overall construction of a clutch disk according to the invention. The clutch disk comprises a hub 1 with internal teeth 3 by means of which the hub 1 can be non-rotatably but axially movably coupled to a gear input shaft (not shown). The gear shaft and all individual parts of the clutch disk are arranged concentrically to an axis of rotation 5. Lateral disks 7, 9 of a load torsional vibration damper 11 designed for load running are rotatably mounted on the hub 1. The lateral disks 7, 9 which are axially spaced from one another are rigidly connected to one another by spacer rivets 13. Clutch friction linings 17 are fastened via a driver disk 15 on the lateral disk 7. Axially between the lateral disks 7, 9 there is arranged a hub disk 19 which is coupled non-rotatably but with a predetermined rotational play to the hub 1 via teeth 21 on its periphery. The load damper 11 comprises a plurality of peripherally distributed helical springs 23 which are designed for load running and torsionally elastically couple the lateral disks 7, 9 to the hub disk 19. FIG. 1 shows merely one of the springs 23 which rest in an aperture 25 of the hub disk 19 and apertures 27, 29 aligned axially therewith in the lateral disks 7, 9 respectively.

The clutch disk comprises in the space, on the one hand radially between the hub 1 and the arrangement region of the load springs 23 and on the other hand axially between the hub disk 19 and the lateral disk 9, an idling torsional vibration damper 31 which is designed for idle running, of which the input part 33 is non-rotatably coupled to the hub disk 19 and of which the output part 35 is non-rotatably held on the hub 1 by means of teeth and rests axially on a shoulder 37 of the hub 1 directed toward the lateral disk 9. Helical springs 39 designed for idle running couple the input part 33 torsionally elastically to the output part 35 in a manner which will be described in more detail hereinafter. The idling damper 31 is active within the rotational play of the teeth 21 during a relative rotation of the hub disk 19 relative to the hub 1.

On the side of the hub disk 19 axially remote from the idling damper 31, there is provided axially between the hub disk 19 and the lateral disk 7 a friction ring 41 which is non-rotatably but axially movably coupled to the lateral disk 7 and is tensioned against the hub disk 19 by a Belleville spring washer 43 arranged between the friction ring 41 and the lateral disk 7. The hub disk 19 is guided axially movably on the hub 1 together with the input part 33 so that the input part 33 is tensioned with a plane friction face 45 against the internal side of the lateral disk 9. The friction ring 41 and the friction face 45, together with the Belleville spring washer 43, form a friction device which is designed for load running and acts during a relative rotation between the lateral disks 7, 9 and the hub disk 19 in load running.

Basic friction which acts in the entire rotational angle range, including the idling range, is ensured by an idling friction device with a friction face 49 which is shaped by a tubular attachment 47 on the internal periphery of the output part 35 and on which the interior of the lateral disk 9 rests. The attachment 47 penetrates a central opening 50 of the input part 33. On the side of the hub disk axially removed from the idling damper 31 there is fixed, between a shoulder 51 of the hub 1 pointing against the shoulder 37 and a bearing ring 53 which is connected non-rotatably and axially rigidly to the lateral disk 7, an axially acting corrugated spring 55 which tensions the lateral disk 9 against the friction face 49 via the spacer rivets 13 and the lateral disk 7.

The clutch disk operates in the following manner:

During idle running, i.e. with relatively low torques to be transmitted, the hub disk 19 and the lateral disks 7, 9 of the load damper 11 form a rotationally engaged unit which can rotate relative to the hub 1 within the rotational play of the teeth 21. Only the idling damper 31 of which the input part 33 is non-rotatably connected to the hub disk 19 and of which the output part 35 is non-rotatably connected to the hub 1 acts within the rotational play of the teeth 21. The frictional force produced by the corrugated spring 55 via the friction face 49 defines the friction moment during idle running.

The idling damper 31 is ineffective and only the load damper 11 is active after the rotational play of the teeth 21 has been compensated. The frictional force is determined on the one hand by the friction face 49 and the corrugated spring 55 and on the other hand on the basis of the relative rotation between hub disk 19 and lateral disks 7, 9 during load running by the friction ring 41 resting on the hub disk 19 or by the friction face 45 resting on the lateral disk 9, which are pretensioned together by the Belleville spring washer 43.

Figure 2:
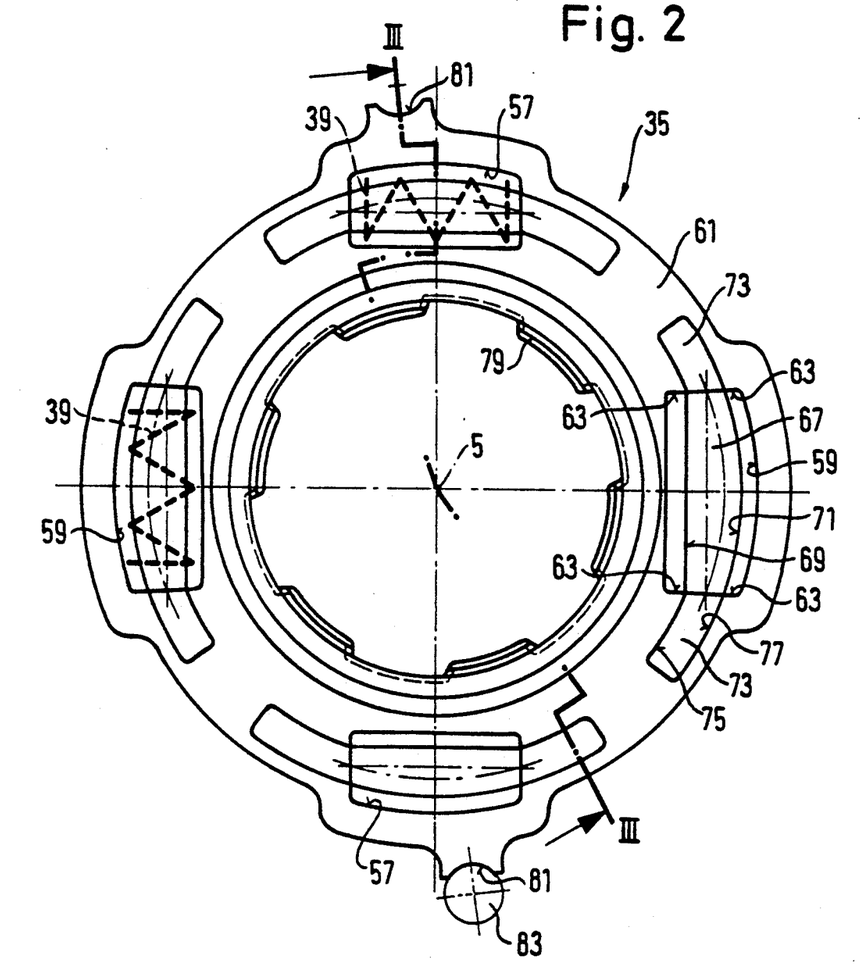
FIG. 2 is a lateral view of an output part of an idling torsional vibration damper of the clutch disk.
Figure 3:
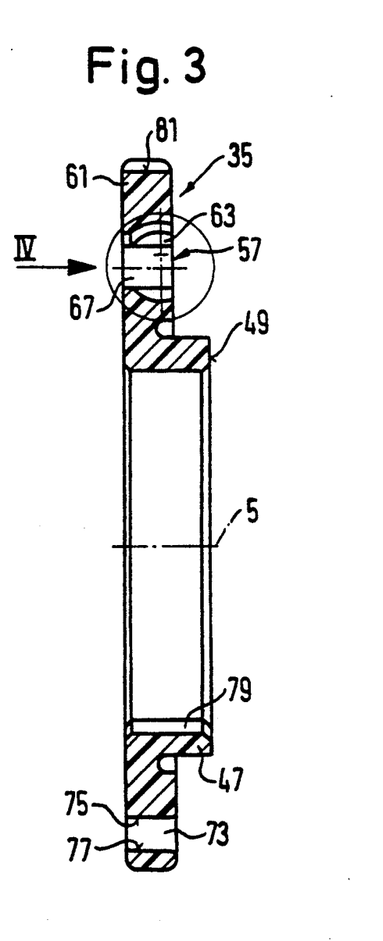
FIG. 3 is a sectional view through the output part, viewed along a line III—III in FIG. 2.
Figure 4:
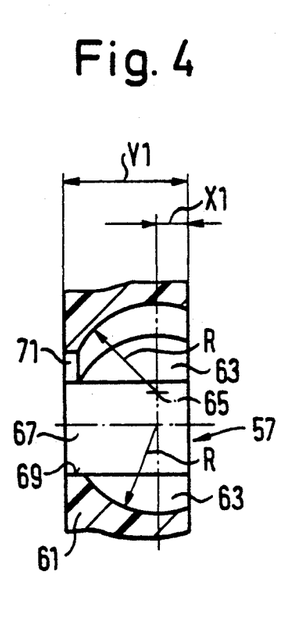
FIG. 4 shows a detail along the arrow IV in FIG. 3.

Details of the idling damper 31 will be described hereinafter with reference to FIGS. 2 to 10. As shown in FIGS. 2 to 4, the output part 35 of the idling damper 31 consists of a substantially disk-shaped integral plastics part into which pockets 57, 59 of different peripheral lengths are shaped to receive the helical springs 39. Whereas the pockets 57 hold the helical springs 39 in the peripheral direction without play, the springs 39 rest in the pockets 59 with play in the peripheral direction. The pockets 57, 59 are open to the side of the input part 33, as shown by the example of the pockets 57 in FIGS. 3 and 4. The thickness Y1 of the output part 35 is greater in its disk-shaped region 61 by an amount X1 than half the external diameter R of a turn of the helical spring 39. The amount X1 is smaller than the amount Y1. The pockets 57, 59 have, at least in the region of their peripherally located end faces 63, a substantially circular sector-shaped contour, the circle centre of which is shifted by the amount X1 from the side of the input part 33 into the disk part 61. The radius R formed by the contour corresponds approximately to half the external diameter of the helical spring 39. The radius R with its centre 65 is shifted radially outwardly by the circular track motion of the circular ends of the helical spring 39 in the peripheral direction in the central region of the pockets 57, 59. On the side axially remote from the input part 33, the pockets 57, 59 open into perforations 67 of which the shape can be seen, in particular, in FIG. 2. In the region of the end faces 63 of the pockets 57, 59, the perforations 67 have a radial height corresponding substantially to the radius R of the helical spring 39. Radially inwardly the perforations 67 are limited by a peripherally rectilinearly extending contour 69 and radially outwardly by a concave contour 71 which is curved round the axis of rotation 5. The pockets 57, 59 as well as the perforations 67 are extended in both peripheral directions by slots 73 which are radially inwardly and radially outwardly limited by arc-shaped portions 75 and 77.

FIG. 3 also shows details of the tubular projection 47 ending in a front face which is normal to the axis and forms the friction face 49. Radially inwardly the output part 35 is provided with teeth 79 which rest without play in the peripheral direction on mating teeth of the hub 1. At the outer periphery, the output part 35 carries, at two diametrally opposed points, guide faces 81 which, during assembly, receive guiding tools which are designed as round rods 83 and orientate the components of the idling damper 31 relative to the hub disk 19. The guide faces 81 are constructed on the periphery of the output part 35 as partial circle faces which are open radially outwardly.

Figure 8:
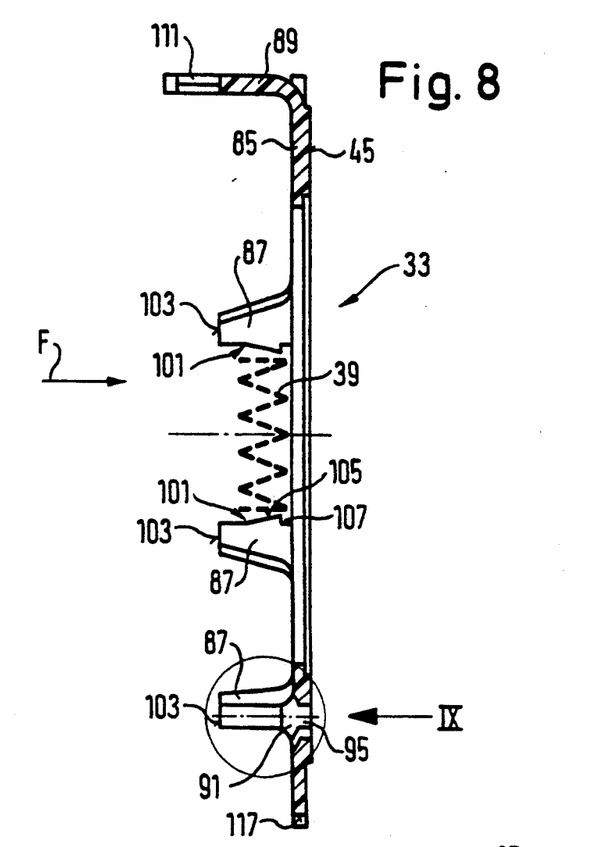
FIG. 8 is a sectional view of the input part as viewed along a line VIII—VIII in FIG. 5.
Figure 9:
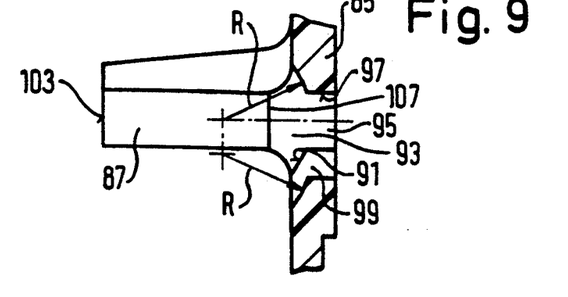
FIG. 9 shows a further detail of the input part along an arrow IX in FIG. 8.

The input part 33 of the idling damper 31 shown in detail in FIGS. 5 to 9 is also produced from plastics material and comprises a relatively thin-walled annular disk part 85 from which projections 8 in a central region and supporting elements 89 from the region of the outer periphery protrude axially in the same direction. The projections 87 are provided in pairs for engagement in the pockets 57 of the output part 35. Further pockets 91 which, as best shown in FIG. 9, are limited in the peripheral direction by end faces 93, are shaped into the disk part 85 between each pair of projections 87. The end faces 93 have a circular sector-shaped contour with a radius R which is substantially equal to half the external diameter of the helical springs 39. The centre of the circle of radius R is located substantially in the centre of the axial span of the projections 87. The pockets 91 in turn open axially into perforations 95 which are radially inwardly limited by a contour 97 extending rectilinearly in the peripheral direction and radially outwardly by a contour 99 which is curved round the axis of rotation 5. In the region of the end faces 93, the radial height of the perforation 95 corresponds substantially to two-thirds of the radius R. The perforations 95 simplify production of the relatively thin-walled input part 33 in the region of the pockets 91 and also reduce the mass moment of inertia. Pockets which are of different peripheral lengths are also provided on the input part 33 with otherwise equal length of the helical springs 39.

The projections 87 controlling the springs 39 together with the end faces 63 of the output part 35 are each provided, on their face turned toward the spring 39, with a nose 101 which falls away toward the free front face 103 of the projection into a bevel 105 and toward the disk part 85 into a step-shaped ledge 107. The bevel 105 ensures that the springs 39 can easily be inserted into the input part 33 in the direction of an arrow F and are held there by the ledge 107 of the nose 101. The axial length of the projections 87 is great enough to allow the front ends of the helical spring 39 to lie on completely. The projections 87 completely penetrate the perforations 67 of the output part 39 and rest with their front faces 103 on the hub disk 19. The projections 87 can escape into the slots 73 of the output part 35 during a relative rotation of input part 33 and output part 35.

Figures 5, 6, 7:
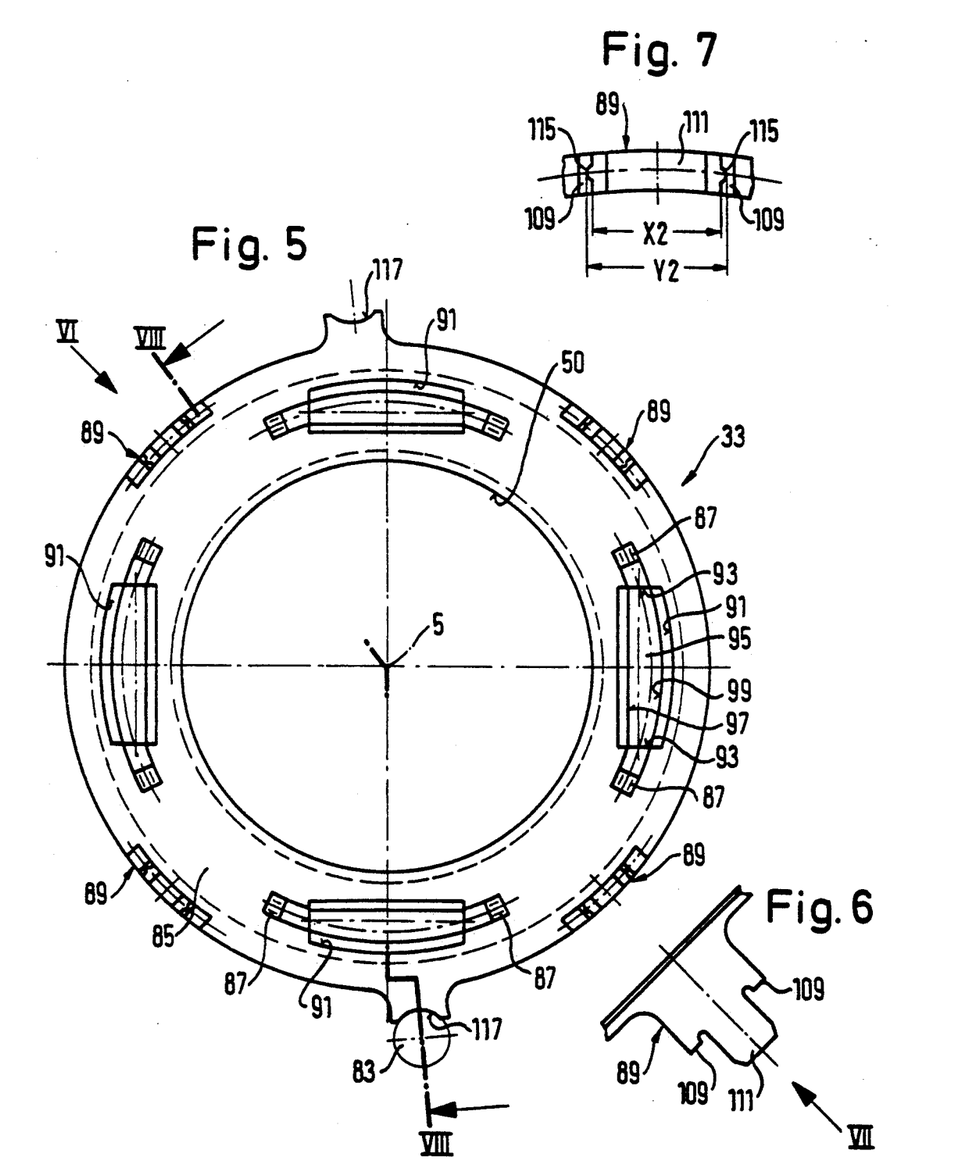
FIG. 5 is a side view of an input part of the idling torsional vibration damper.
FIG. 6 shows a detail of the input part along an arrow VI in FIG. 5.
FIG. 7 shows a further detail of the input part along an arrow VII in FIG. 6.

The supporting elements 89 are arranged on a greater diameter of the disk part 85 than the projections 87 and are offset peripherally relative to the projections 87. Details of the supporting elements 89 will emerge, in particular, from FIGS. 6 and 7. In the peripheral direction, each of the supporting elements 89 forms a foot which ends in two axial stops 109 with which the supporting elements 89 rest on the hub disk 19 in the fitted state. Between the axial stops 109 there protrude projections 111 which, in the fitted state, engage in openings 113 (FIG. 10) in the hub disk 19 and non-rotatably connect the input part 33 to the hub disk. To simplify assembly, the projections 111 as well as the openings 113 have a substantially rectangular basic cross section. The openings 113 are somewhat broader in the peripheral direction than the corresponding rectangular dimension of the projection 111. However, the peripherally located lateral faces of the projection 111 are provided, for compensation purposes, with axially longitudinally extending ribs 115 which have a small overlap with the lateral walls of the opening 113. During assembly, the ribs 115 are therefore partially plastically deformed, producing a non-rotatable connection without slack in the peripheral direction. FIG. 7 shows the dimension of the base member of the projection 111 in the peripheral direction at X2, whereas the two projecting ribs 115 define a distance Y2. The opening 113 in the hub disk 19 (FIG. 10) has a dimension Z in the peripheral direction which is between the two amounts X2 and Y2. FIG. 8 also shows the friction face 45 formed on the side of the disk part 85 axially remote from the projections 87 and the supporting elements 89.

Guide faces 117 for the guiding tool 83 already mentioned in connection with the output part 35 are shaped at two substantially diametrally opposed points on the outer periphery of the input part 33. The guide faces 117 are in turn radially outwardly open partial circle faces. The guide faces 117 are arranged such that they correspond to the guide faces 81 of the output part 35 in the unloaded state of the helical springs 39.

Figure 10:
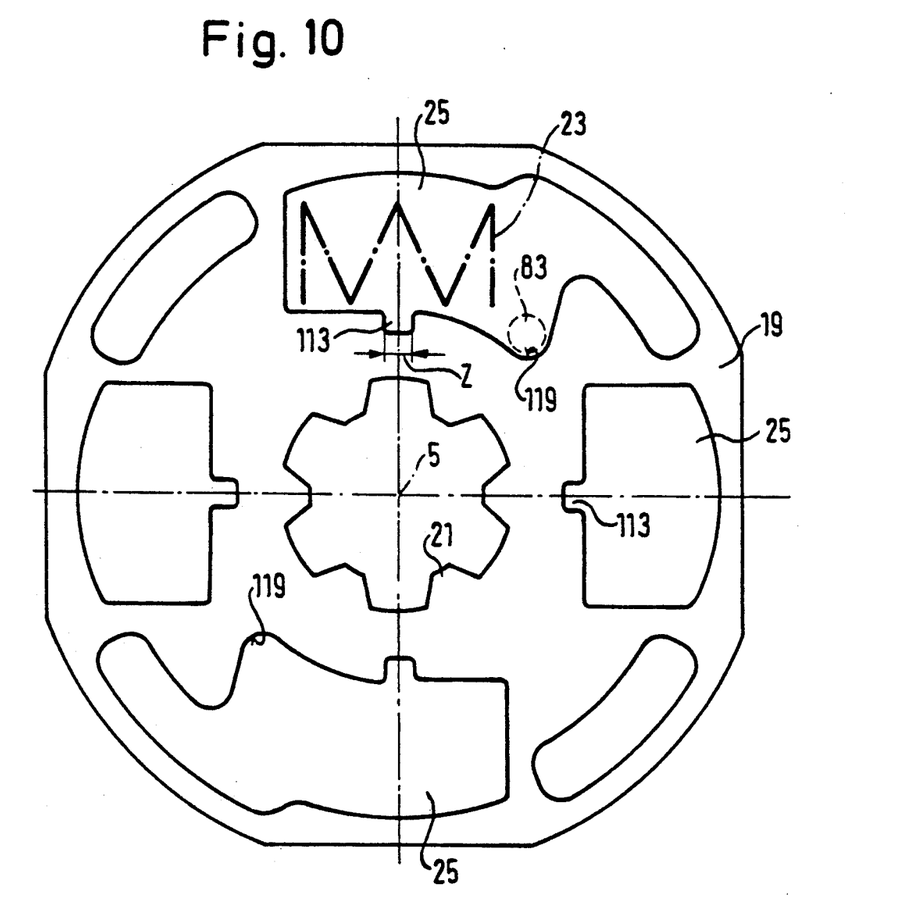
FIG. 10 is a side view of a hub disk of the clutch disk.

FIG. 10 shows details of the hub disk 19 and of the apertures 25 intended to receive the helical springs 23. A pair of the diametrally opposed apertures 25 is intended for helical springs which both come into use simultaneously in both peripheral directions. A further pair of apertures 25 is extended in one peripheral direction so that, during the relative rotation between hub disk 19 and lateral disks 7, 9, the helical springs 23 inserted therein do not come into use in this peripheral direction or come into use only after a rotational play has been used up. In the extended regions of these apertures 25, there are in turn shaped guide faces 119 into which the above-mentioned guiding tool 83 engages during assembly and orientates the input part 33, the output part 35 relative to the hub disk 19. The arrangement of the guide faces 119 in the region of the end edges of the apertures 25 is particularly desirable as separate openings, which would otherwise weaken the hub disk 19, do not have to be provided here. The guide faces 119 are provided in the region of the transition of the radially inner edge into the end edge of the aperture 25. The openings 113 for engagement of the supporting elements 89 are also arranged in the radially inner limiting edge.

The input part 33 and the output part 35 of the idling damper 31 are produced from polyamide plastic material by injection moulding in each case, adequate strength of the components being produced by adding about 30% by weight of glass fibres having a short fibre length. The plastic material also has a content of about 15% of polytetrafluoroethylene (PTFE) which moderates the aggressive properties of the glass fibres and ensures constant frictional properties over the service life. The output part 35 also contains about 2% by weight of silicon which, together with the PTFE content, ensures a constant, low coefficient of friction of about 0.18 to 0.20. The coefficient of friction of the input part 33, of which the plastic material contains no silicon, is higher and is, for example, about 0.25. Owing to the above-mentioned material composition, the input part 33 and the output part 35 can be produced very simply by injection moulding, inexpensive mass production being possible despite the relatively complicated constructional shape. The material composition can withstand high temperatures of the type occurring during the production of frictional forces, and is also very resistant to abrasion.

While specific embodiments of the invention have been shown and described in detail to illustrate the application of the inventive principles, it will be understood that the invention may be embodied otherwise without departing from such principles.

What we claim is:

1. A clutch disk for a motor vehicle friction clutch comprising:
   a hub which defines an axis of rotation;
   a load torsional vibration damper designed for load running with two lateral disks which are axially spaced from one another, are rigidly connected to one another, and are mounted so as to rotate equiaxially on the hub;
   a hub disk which is arranged axially between the lateral disks and is connected non-rotatably but with limited rotational play to the hub;

a plurality of load springs which rest in apertures in the lateral disk and the hub disk, and are distributed in the peripheral direction, are designed for load running;

an idling torsional vibration damper, which is designed for idle running and acts within said limited rotational play coupling the hub disk to the hub, with an input part of plastics material, non-rotatably connected to the hub disk;

an output part non-rotatably connected to the hub and at least one idling spring which couples these parts torsionally elastically to one another, is designed for idle running, wherein a first one of these two parts has a peripherally elongated pocket, which is peripherally limited by end faces, for each idling spring and a second one of these two parts has peripherally spaced axially protruding projections which engage in pairs in each pocket and, together with the end faces, enclose the idling spring between themselves, wherein arc-shaped pocket extensions into which the projections escape during a relative rotation of input part and output part adjoin each pocket on both sides in the peripheral direction, wherein the input part and the output part are arranged radially between the hub and the arrangement region of the load springs and axially between the hub disk and a first one of the two lateral disks and the output part is located substantially axially between the input part and the hub disk, and wherein the input part forms a plane friction face with which it rests in frictional contact on the first lateral disk and, over a diameter which is greater than the diameter on which the projections are arranged, has a plurality of peripherally mutually offset supporting elements which engage axially in openings in the hub disk for non-rotatable connection of the input part to the hub disk and comprise axial stops resting on the hub disk;

a load friction device designed for load running with an axially acting spring which tensions at least the friction face of the input part and the first lateral disk axially against one another; and clutch friction linings held on one of the lateral disks, wherein the output part is produced integrally from plastics material, is fixed toward the hub disk on an axial stop of the hub and contains the pockets and wherein the projections are offset peripherally relative to the supporting elements and are shaped integrally on the input part together with the supporting elements.

2. The clutch disk of claim 1, wherein the pocket and the pocket extensions are perforated toward the hub disk and wherein the projections of the input part penetrate axially through the pocket or the pocket extensions and rest with their front ends axially supported on the hub disk.

3. The clutch disk of claim 1, wherein, between the end faces of each pocket, the output part comprises an axial perforation which opens the pocket toward the hub disk and of which the radial height in the region of the end faces of the pocket is substantially equal to half the external diameter of the idling spring.

4. The clutch disk of claim 3, wherein the axial perforation is limited radially inwardly by a face extending rectilinearly in the peripheral direction and radially outwardly by a face which is curved round the axis of rotation.

5. The clutch disk of claim 3 wherein the pocket extensions are constructed as axially continuous slots which are limited by radially inner and outer circular arc faces and into which the perforation passes.

6. The clutch disk of claim 1, wherein at least one guide face for a guiding tool is shaped on the input part, on the output part and on the hub disk respectively and the guide faces are orientated axially relative to one another in the unloaded state of the idling spring.

7. The clutch disk of claim 6, wherein the guide faces of the input part and of the output part are constructed as radially outwardly open partial circle faces at the periphery of the input part and of the output part.

8. The clutch disk of claim 6, wherein at least one of the load springs is arranged in an aperture of the hub disk, the aperture being peripherally enlarged in one of the two relative directions of rotation of hub disk and lateral disks and keeping the load spring unloaded in a portion of the relative rotation and wherein the guide face of the hub disk is formed by an enlargement of the aperture in the region of its end which is located in the peripheral direction and forms a stop for the load spring.

9. The clutch disk of claim 1, wherein at least a pair of diametrally opposed guide faces is provided both on the input part and on the output part and on the hub disk.

10. The clutch disk of claim 1, wherein at least one of the input part and the output part is produced from polyamide which contains about 30% of glass fibre and about 15% of polytetrafluoroethylene.

11. The clutch disk of claim 10, wherein the output part further contains about 2% of silicon.

12. A clutch disk for a motor vehicle friction clutch comprising:

a hub which defines an axis of rotation;

a load torsional vibration damper designed for load running with two lateral disks which are axially spaced from one another, are rigidly connected to one another and are mounted so as to rotate equiaxially on the hub;

a hub disk which is arranged axially between the lateral disks and is connected non-rotatably but with limited rotational play to the hub and a plurality of load springs which rest in apertures in the lateral disk and the hub disk, are distributed in the peripheral direction, are designed for load running, an idling torsional vibration damper, which is designed for idle running and acts within said limited rotational play coupling the hub disk to the hub, with an input part of plastics material, non-rotatably connected to the hub disk, an output part non-rotatably connected to the hub and at least one idling spring which couples these parts torsionally elastically to one another, is designed for idle running, wherein a first one of these two parts has a peripherally elongated pocket, which is peripherally limited by end faces, for each idling spring and a second one of these two parts has peripherally spaced axially protruding projections which engage in pairs in each pocket and, together with the end faces, enclose the idling spring between themselves, wherein arc-shaped pocket extensions into which the projections escape during a relative rotation of input part and output part adjoin each pocket on both sides in the peripheral direction, wherein the input part and the output part are arranged radially between the hub and the arrangement region of the load springs and axially between the hub disk and a first one of the two lateral disks and the output part is located substantially axially between the input part and the hub disk, and wherein the input part forms a plane friction face with which it rests in frictional contact on the first lateral disk and, over a diameter which is greater than the diameter on which the projections are arranged, has a plurality of peripherally mutually offset supporting elements which engage axially in openings in the hub disk for non-rotatable connection of the input part to the hub disk and comprise axial stops resting on the hub disk;

a load friction device designed for load running with an axially acting spring which tensions at least the friction face of the input part and the first lateral disk axially against one another; and clutch friction linings held on one of the lateral disks, wherein the output part is produced integrally from plastics material, is fixed toward the hub disk on an axial stop of the hub and contains the pockets and wherein the projections are offset peripherally relative to the supporting elements and are shaped integrally on the input part together with the supporting elements.

13. The clutch disk of claim 12, further comprising:
at least one nose, wherein each of said at least one nose has an entry bevel for the end of the spring on its side located axially toward the free end of the projection and a catch ledge on its side axially removed from the free end of the projection.

14. The clutch disk of claim 12, wherein the output part contains each pocket intended for engagement of the projections and is constructed, at least in the diametral region containing the pocket, as a plane disk of which the axial thickness is greater, by an amount which is smaller than the thickness, than half the external diameter of the idling spring received by the pocket, and wherein each pocket is peripherally limited by end faces with a circular sector-shaped contour, the circle centre of which is at approximately a distance corresponding to said amount from the lateral face of the disk adjacent to the input part and the circle radius of which is substantially equal to half the external diameter of the idling spring.

15. The clutch disk of claim 12, wherein the pockets intended for the engagement of the projections are provided on the output part and the projections on the input part and wherein, in the peripheral direction between each pair of projections holding the idling spring, the input part has a further pocket which is peripherally limited by end faces which have a circular sector-shaped contour of which the radius is substantially equal to half the external diameter of the idling spring and of which the circle centre is located approximately in the centre of the axial span of the projections.

16. The clutch disk of claim 15, wherein on the side axially facing the first lateral disk, the further pocket opens into a perforation of which the radial height in the region of the end faces is approximately equal to two-thirds of the circular sector radius.

17. The clutch disk of claim 16, wherein the perforation of the further pockets is limited radially inwardly by a face extending rectilinearly in the peripheral direction and radially outwardly by a face curved round the axis of rotation.

18. The clutch disk of claim 12, wherein the supporting elements and the openings of the hub disk into which they engage have an approximately rectangular cross section and wherein an axially extending rib is shaped on at least one axially extending longitudinal side of each supporting element, the rib partially overlapping the contour of the opening and being plastically deformed when the input part is fitted on the hub disk.

19. The clutch disk of claim 12,
wherein the output part has, in its radially inner region, an axially protruding tubular projection which penetrates a central opening in the input part and rests with its front face in frictional contact on the first lateral disk and wherein an axially acting spring of an idling friction device is arranged axially between a second of the two lateral disks and the hub disk and is fixed between the second lateral disk and a stop shoulder of the hub and tensions the first lateral disk against the front face of the tubular projection.

20. The clutch disk of claim 12,
wherein at least one guide face for a guiding tool is shaped on the input part, on the output part and on the hub disk respectively and the guide faces are orientated axially relative to one another in the unloaded state of the idling spring.

21. The clutch disk of claim 20, wherein the guide faces of the input part and of the output part are constructed as radially outwardly open partial circle faces at the periphery of the input part and of the output part.

22. The clutch disk of claim 20, wherein
at least one of the load springs is arranged in an aperture of the hub disk, the aperture being peripherally enlarged in one of the two relative directions of rotation of hub disk and lateral disks and keeping the load spring unloaded in a portion of the relative rotation and wherein the guide face, of the hub disk is formed by an enlargement of the aperture in the region of its end which is located in the peripheral direction and forms a stop for the load spring.

23. The clutch disk of claim 20,
wherein at least a pair of diametrally opposed guide faces is provided both on the input part and on the output part and on the hub disk.

24. The clutch disk of claim 12, wherein at least one of the input part and the output part is produced from polyamide which contains about 30% of glass fibre and about 15% of polytetrafluoroethylene.

25. The clutch disk of claim 24, wherein the output part further contains about 2% of silicon.

* * * * *